(12) United States Patent
Horneman et al.

(10) Patent No.: US 8,406,782 B2
(45) Date of Patent: Mar. 26, 2013

(54) CELL IDENTIFIERS IN A CELLULAR COMMUNICATION SYSTEM

(75) Inventors: Kari Veikko Horneman, Oulu (FI); Vinh Van Phan, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 123 days.

(21) Appl. No.: 12/933,765

(22) PCT Filed: Mar. 26, 2009

(86) PCT No.: PCT/EP2009/053587
§ 371 (c)(1),
(2), (4) Date: Sep. 21, 2010

(87) PCT Pub. No.: WO2009/118378
PCT Pub. Date: Oct. 1, 2009

(65) Prior Publication Data
US 2011/0021205 A1    Jan. 27, 2011

(30) Foreign Application Priority Data

Mar. 28, 2008   (FI) ...................................... 20085253

(51) Int. Cl.
*H04Q 7/20* (2006.01)
(52) U.S. Cl. .................. 455/452.2; 455/450; 455/550.1; 370/329
(58) Field of Classification Search ............... 455/452.2, 455/450, 550.1; 370/329
See application file for complete search history.

(56) References Cited

U.S. PATENT DOCUMENTS

| | | | |
|---|---|---|---|
| 2005/0079854 A1* | 4/2005 | Auth et al. | 455/403 |
| 2005/0255890 A1 | 11/2005 | Nakada | 455/561 |
| 2006/0172707 A1 | 8/2006 | Stern-Berkowitz et al. | 455/67.11 |
| 2008/0039141 A1 | 2/2008 | Claussen et al. | 455/561 |
| 2008/0242308 A1* | 10/2008 | Gunnarsson et al. | 455/450 |
| 2008/0268861 A1* | 10/2008 | Buracchini et al. | 455/452.1 |

FOREIGN PATENT DOCUMENTS

WO    WO 2005/015917 A2    2/2005

* cited by examiner

*Primary Examiner* — Danh Le
(74) *Attorney, Agent, or Firm* — Harrington & Smith

(57) ABSTRACT

A solution is provided for dynamic allocation of cell identifiers in a cellular mobile telecommunication system. Cell identifiers being reused in a cellular radio access network of the cellular mobile telecommunication system are managed by a cell identifier manager configured to handle dynamic allocation of the cell identifiers to a plurality of base stations. Upon detection of a new base station or reactivation of an existing base station in the radio access network, the cell identifier manager allocates a cell identifier to the base station in such a manner that two base stations having the same cell identifier do not interfere with one another, i.e. do not cause cell identification problems in the radio access network.

21 Claims, 4 Drawing Sheets

CELL IDENTIFIERS IN A CELLULAR COMMUNICATION SYSTEM

The invention relates to the field of cellular radio telecommunications and, particularly, to allocation of cell identifiers to base stations of a cellular telecommunication system.

BACKGROUND

Network planning of a cellular telecommunication network undergoes constant development due to increasing and/or changing capacity requirements and appearance of new structures affecting the coverage of cellular networks. Therefore, new cells or base stations are added to the cellular networks to increase the capacity and to provide improved coverage. Additionally, private base stations also known as home Node B's within the 3GPP ($3^{rd}$ Generation Partnership Project) have gathered extensive interest recently. A private base station may be considered as a personal base station exclusive to a single user or a group of users. On the network side, the private base station functions as a conventional base station in many ways except for the limitation to selected subscriber terminals the private base station is configured to serve.

Each cell is identified in the cellular network by a global or logical identifier which is unique to the base station in the whole mobile telecommunication network and by a physical layer cell identifier (PLCID) which is unique to the cell in a geographically limited area due to the limited number of available PLCIDs. If a base station provides service for only a single cell, the base station may be allocated a single PLCID. On the other hand, if a base station controls multiple cells, the base station may be allocated multiple PLCIDs (one for each cell). The PLCID is a signal sequence broadcast by the base station on a synchronization channel, and a mobile station identifies the base station from the signal sequence upon obtaining synchronization with the base station. In a long-term evolution (LTE) of Universal Mobile Telecommunication System (UMTS), the PLCID is a unique combination of one orthogonal sequence and one pseudo-random sequence, thereby resulting in a total number of 510 different PLCIDs and expected reuse of the PLCIDs in a cellular radio access network of UMTS LTE.

Neighboring cells or cells relatively close to each other should not use the same PLCID to prevent the mobile stations from acquiring synchronization with two base stations having the same PLCID, which would result in identity and interference problems severely disturbing the network operation. In conventional systems, a PLCID for a new cell to be added to the radio access network is derived from radio network planning information and preconfigured in a base station associated with the cell. Upon powering up the base station, the base station reads the PLCID from its memory, applies the PLCID, and broadcasts a signal sequence associated with the PLCID within the cell to enable mobile stations to identify the cell.

Preconfiguration of the PLCIDs to the base stations is, however, a cumbersome procedure which applies very poorly to the current networks with private base stations being established at random locations in the cellular network due to the unpredictability use characteristics of conventional users of the private base stations. For example, a given user may move his/her private base station to a location close to a public base station having the same PLCID as the private base station. This may result in identification problems and interference deteriorating the communication quality of both public and private base stations having the same PLCID. Therefore, a need exists not only to take into account the existence and unpredictable use of the private base stations but also to improve the flexibility of the PLCID allocation.

BRIEF DESCRIPTION

An object of the invention is to provide flexibility to the allocation of cell identifiers to base stations of a mobile telecommunication system.

According to an aspect of the present invention, there are provided methods as specified in claims 1 and 12.

According to another aspect of the present invention, there are provided apparatuses as specified in claims 17, 27 and 38.

According to another aspect of the present invention, there are provided apparatuses as specified in claims 32 and 33.

According to yet another aspect of the present invention, there are provided computer program products embodied on computer-readable distribution media as specified in claims 34 and 35.

According to yet another aspect of the present invention, there is provided a telecommunication signal as specified in claim 36.

Embodiments of the invention are defined in the dependent claims.

LIST OF DRAWINGS

Embodiments of the present invention are described below, by way of example only, with reference to the accompanying drawings, in which FIG. 1 illustrates a cellular radio access network structure to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is made to the same embodiment(s), or that the feature only applies to a single embodiment. Single features of different embodiments may also be combined to provide other embodiments.

Figure 1:
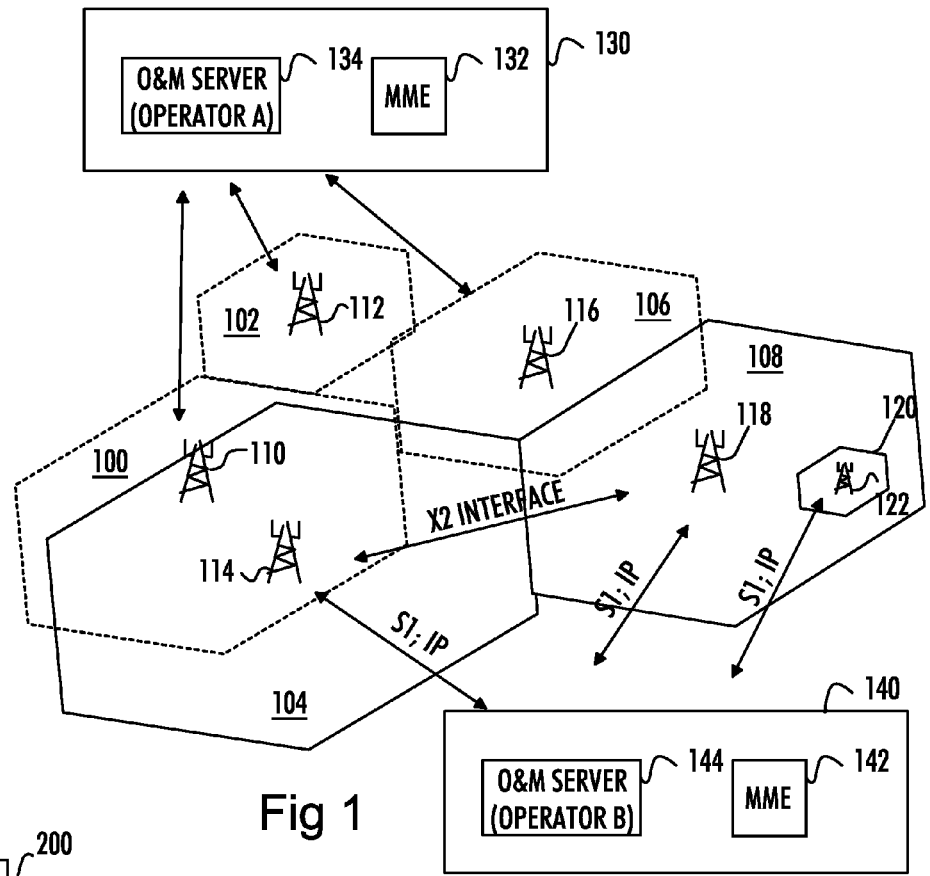

A general architecture of a radio access network of a cellular telecommunication system is illustrated in FIG. 1. Elements and connections of FIG. 1 relate to a long-term evolution (LTE) version of UMTS (Universal Mobile Telecommunication System) but the radio cellular telecommunication system may equally be an IMT-A (ITU International Mobile Telecommunications—Advanced) or another cellular telecommunication system.

FIG. 1 illustrates actually two radio access networks located in the same geographical area and operated by different network operators. Base stations 110, 112, and 116 associated with cells 100, 102, and 106, respectively, are operated by a first operator (operator A). The cells 100, 102, and 106 of the first operator are marked with dashed lines. Base stations 114, 118, and 122 associated with cells 104, 108, and 120, respectively, are operated by a second operator (operator B). The cells 104, 108, and 120 of the second operator are marked with solid lines. The cell 120 may be formed by a private base station (home Node B) located within the cell 108. While not being illustrated in FIG. 1, additional cells formed by private base stations may exist within the other cells 100 to 108. Moreover, the radio access networks of the two operators A and B may overlap completely with respect to each other, although this is not illustrated in FIG. 1 for the sake of clarity of illustration.

In FIG. 1, the base stations 110, 112, 116 of the first operator are connected to common servers of the radio access network of the first operator, while the base stations 114, 118, 122 of the second operator are connected to common servers of the radio access network of the second operator. Common servers 130, 140 may include an operation & maintenance (O&M) server 134 and 144 and a mobility management entity 132, 142. The O&M servers 134, 144 are radio resource controlling elements responsible for controlling allocation of radio resources in the radio access networks, monitoring the performance of the radio access networks, etc. The mobility management entities are in charge of routing the connection of individual mobile stations served by the radio access network. The connections between the base stations and the O&M server may be implemented as Internet Protocol (IP) connections. The base stations of the same operator may communicate with each other over an X2 interface and with the mobility management entity over an S1 interface. The X2 and S1 interfaces are defined in more detail in specifications of the UMTS LTE.

The present invention relates to flexible allocation and assignment of cell identifiers to base stations of one or more radio access networks. The present invention provides a cell identifier manager, e.g. a physical layer cell identifier (PLCID) manager, configured to manage cell identifiers in a cellular radio access network and to allocate the cell identifiers to a plurality of base stations. The description of the following embodiments focuses on the allocation of PLCIDs by the PLCID manager, but the invention is applicable to other cell identifiers as well. Upon establishment of a new base station in the radio access network, the PLCID manager allocates a PLCID to the base station in such manner that the spatial reuse of the limited number of PLCIDs is carried out efficiently and without conflicts between base stations located in the same local cell neighborhood and allocated the same PLCID.

For the sake of simplicity, the embodiments described below relate to a case where a base station controls a single cell. As mentioned in the background section, the PLCID is a cell-specific identifier, i.e. not a base-station-specific one, so if a base station controls multiple cells, multiple PLCIDs are allocated to the base station (one for each cell).

The PLCID manager may be configured to manage the PLCIDs for one or more of cellular radio access networks operated by one or more network operators. Accordingly, the PLCID manager may be an entity maintained by a single network operator and it may be configured to manage PLCIDs only for the radio access network of that network operator. Alternatively, the PLCID manager may manage the PLCIDs for multiple radio access networks operated by different network operators. In both embodiments, the PLCID manager is capable of ensuring that PLCIDs of base stations belonging to the different operators do not cause conflicts with each other. That is, conflicts in which two base stations belonging to different operators are allocated the same PLCID and are located close to each other can be avoided. The PLCID manager may be operated and maintained by one network operator or a third party.

Figure 2:
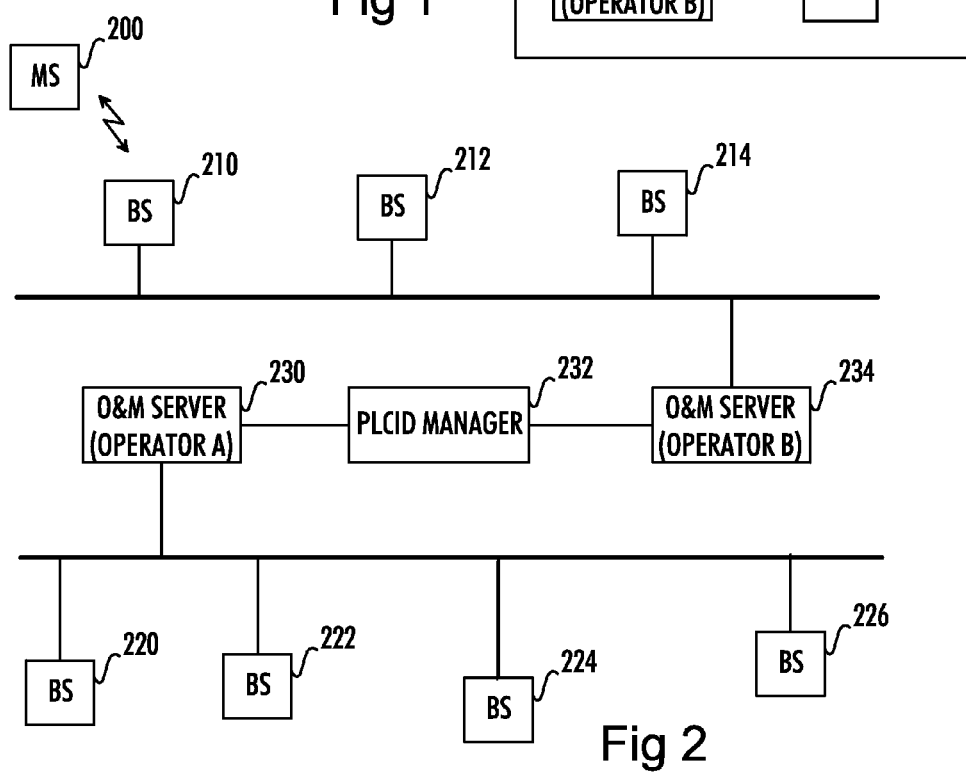
FIG. 2 illustrates connections between entities of a cellular radio access network according to an embodiment of the invention.

FIG. 2 illustrates connections between a PLCID manager 232 and entities of two cellular radio access networks according to an embodiment of the invention. In this example, base stations 220, 222, 224, and 226 belong to a cellular access network of a first operator (operator A) and are connected to the PLCID manager 232 through an O&M server 230 of the first operator. The O&M server 230 may be the same as the O&M server 134 described above with reference to FIG. 1. Similarly, base stations 210, 212, and 214 belong to a cellular access network of a second operator (operator B) and are connected to the PLCID manager 232 through an O&M server 234 of the second operator. The O&M server 234 may be the same as the O&M server 144 described above with reference to FIG. 1. The base stations 210 to 226 may be active base stations, i.e. they may provide communication services to mobile stations 200. The connections illustrated in FIG. 2 are logical connections, and the physical locations of the O&M servers 230, 234 and the PLCID manager 232 may differ, depending on the implementation. For example, the PLCID manager 232 may be located in the same physical location as common servers of either one of the cellular radio access networks.

Let us now describe a procedure for allocating a PLCID to a new base station being configured for use in the cellular radio access network. In this example, the new base station is added to the radio access network of the first operator A, and the procedure is described with reference to a signaling diagram illustrated in FIG. 3.

Figure 3:
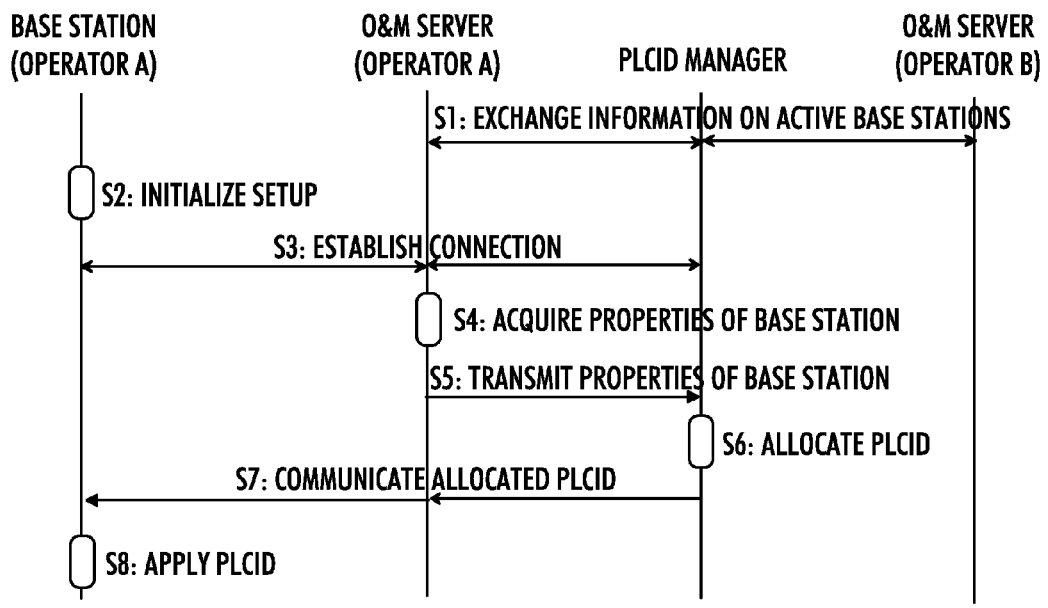
FIG. 3 illustrates signaling between the entities illustrated in FIG. 2 according to an embodiment of the invention.

The PLCID manager maintains information on PLCIDs currently allocated to base stations of the radio access networks operated by both the first and the second operator. Accordingly, the PLCID manager stores a record comprising identifiers of active base stations and a PLCID allocated to each of the active base stations. Additionally, the PLCID manager stores information related to current cell topology of the radio access networks. In practice, the PLCID manager stores information needed to define the cell topology, and such information may include information related to coverage dimensions of each active base station. The information related to the coverage dimensions may include a cell range, a maximum transmit power, a measure for a cell size and shape of a base station, etc. Furthermore, the PLCID manager may store frequency carrier and bandwidth information for each active base station in order to find out the operational frequency bands of the base stations. The cell topology and the operational frequency bands of the base stations are needed to ensure that the same PLCID will not be allocated to two base stations that are located close to each other and use overlapping frequency bands in order to avoid conflicts. The O&M servers 230, 234 are responsible for radio resource allocation, and they have knowledge about coverage parameters of each base station they control. Naturally, the PLCID manager stores also PLCIDs available for allocation. Referring to FIG. 3, information related to the cell topology and frequency resource allocation is transmitted from the O&M servers 230, 234 to the PLCID manager in S1. This type of information may be obtained and transmitted to the PLCID manager when the base stations were set up for the operation in the radio access networks.

Now, let us consider a case where a new base station is being added to a radio access network of the first operator. The new base station may be a public base station being added in order to improve the coverage and capacity of the radio access network, or it may be a private base station being added to provide private communication services to specific group of user terminals. Setting the new base station up for the operation in the radio access network is initialized in S2. The initialization may include connecting the new base station physically to an Internet Protocol (IP) network of the radio access network, powering up the base station, and starting execution of a setup procedure in the base station. The setup procedure may be a software program executed in the base station automatically the first time the base station is powered up. A part of the setup procedure related to the allocation of the PLCID is now described in more detail. The setup procedure may include other sub-procedures, such as radio resource allocation under the control of the O&M server, but these are not described in greater detail herein.

In S3, a communication connection is first established between the new base station being set up for the operation and the PLCID manager through the O&M server configured to control radio resource allocation in the area of the new base station. Since the communication connection between the O&M server and the PLCID manager may have been established already in relation to S1, it may suffice to only establish the communication connection between the base station and the O&M server and to utilize the existing communication connection between the O&M server and the PLCID manager for communication related to the new base station. The connections between the elements may be IP connections.

In S4, the O&M server acquires properties of the new base station being set up for the operation. After the connection between the new base station and the O&M server has been established and the O&M server has detected the presence of the new base station in the radio access network, the base station and the O&M server may be configured to carry out a communication procedure in which the base station may send to the O&M server a type identification message in which the base station informs the O&M server of the type of the base station, i.e. public or private base station, and transmission capabilities of the base station. The transmission capabilities may include coverage dimensions of the base station, e.g. cell range, maximum transmit power, one or more measures related to the cell size and shape, etc. The O&M server may then carry out radio resource allocation to the base station on the basis of the properties of the base station and radio resources already allocated within the neighboring cells of the new base station. Moreover, the O&M server may be configured to acquire knowledge of the geographical location of the new base station. The location of the new base station may be determined by the base station itself with the help of a positioning system, such as GPS (Global Positioning System), and the base station may transmit the GPS coordinates to the O&M server. Alternatively, the O&M server may be configured to determine the location of the new base station from an IP address allocated to the base station, for example. It is commonly known that a rough location of a network node may be determined from its IP address. Moreover, the location of the base station may be determined from routing information on the connection between the O&M server and the base station. Naturally, other methods for determining the location of the base station are possible.

In S5, the O&M server forwards the properties and location of the new base station to the PLCID manager for allocation of the PLCID to the new base station. Additionally, the O&M server may inform the PLCID manager about a carrier frequency and bandwidth allocated to the new base station, or the carrier frequency and the bandwidth may be allocated after the allocation of the PLCID. In S6, the PLCID manager allocates a PLCID to the new base station on the basis of the information received from the O&M server and related to the new base station.

There are several embodiments for the allocation of PLCIDs to a base station. In a first embodiment, hard sharing of the PLCIDs between operators is applied by dividing the total number of PLCIDs (510 in the UMTS LTE) into a plurality of subsets of PLCIDs, wherein the number of subsets is equal to the number of operators in a determined geographical area controlled by the PLCID manager and/or on a determined frequency band. Each subset of cell identifiers is designated for allocation to one operator. The PLCIDs may be allocated to the subsets equally so that each operator is provided with the same number of PLCIDs, or the PLCIDs may be allocated to the subsets according to respective base station densities of the operators within the area. Accordingly, the PLCID manager allocates to the new base station a PLCID from the subset of PLCIDs designated to the first operator. Naturally, the PLCID manager allocates the PLCID to the new base station from PLCIDs available for allocation, i.e. not already allocated to another base station of the same operator. This embodiment may be implemented with no need to take properties of the new base station and other base stations into account when allocating PLCIDs.

The PLCID manager may be configured to change the division of the cell identifiers in the plurality of subsets dynamically according to the utilization of the cell identifiers in at least one of the subsets. Accordingly, if a subset of the first operator is running out of PLCIDs, while a subset of the second operator has an excess number of PLCIDs available for allocation, the PLCID manager may temporarily move PLCIDs from the subset of the second operator to the subset of the first operator. However, the PLCID manager may be configured to leave at least a minimum number of available PLCIDs in the subset of the second operator.

In a second embodiment, all the PLCIDs are available for allocation to any operator within a determined geographical area and frequency band, and the PLCID manager is configured to allocate to the base station being configured a PLCID on the basis of the properties of the base station received in S5 and information on the other active base stations received in S1. The PLCID manager allocates to the new base station a PLCID which has not been allocated to a base station located within a predetermined distance from the new base station and having a frequency spectrum overlapping with the frequency spectrum of the base station being configured. As mentioned above, the PLCID manager is constantly aware of locations active base stations, their PLCIDs and operative frequency bands, and cell topology, i.e. coverage areas of the active base stations in a control area of the PLCID manager but also in neighboring control areas controlled by neighboring PLCID managers. The knowledge of cell topologies and allocated PLCIDs of neighboring control areas may be stored in the PLCID manager to ensure that neighboring base stations at the edges of the two control areas and using overlapping frequency bands are not allocated the same PLCID.

Accordingly, the PLCID manager has means for allocating the PLCIDs in such a manner that the same PLCID will not be allocated to two base stations located within a predetermined distance from each other and sharing overlapping frequency bands. The predetermined distance means a distance between the edges of the cells of the base stations plus a determined distance-related safety margin. Another safety margin related to frequency bands, a guard band, may also be applied to ensure that frequency leakage cannot cause cell identification problems.

A third embodiment is a hybrid of the first and second embodiment. Consequently, the PLCIDs are divided into subsets and each set is designated to base stations of a single operator according to the first embodiment, and the PLCIDs are allocated to base stations of a given operator from the subset of the operator according to the second embodiment. The PLCID manager naturally considers the PLCIDs allocated to active base stations of the other operators when allocating a PLCID to a base station of a given operator to prevent cell identification problems between base stations of different operators.

In S7, the PLCID allocated to the new base stations is communicated to the new base station over the IP communication connection established in S3. Accordingly, the PLCID may be communicated to the new base station via the O&M server. If the system is configured to carry out radio resource allocation after the allocation of the PLCID, the PLCID manager may be configured to allocate the PLCID on the basis of the cell topology, i.e. without the operative frequency band information on the base stations, and the O&M server may read the PLCID received from the PLCID manager and allocate the frequency resources such that the new base station is not allocated a frequency resource overlapping with frequency resources of another base station within the determined distance from the new base stations and having the same PLCID.

In S8, the new base station applies the received PLCID, i.e. forms a combination of the orthogonal sequence and pseudo random sequence corresponding to the received PLCID, and starts broadcasting the signal sequence to a radio interface according to a transmission pattern defined in a communication protocol and according to the radio resources allocated by the O&M server.

Figure 4:
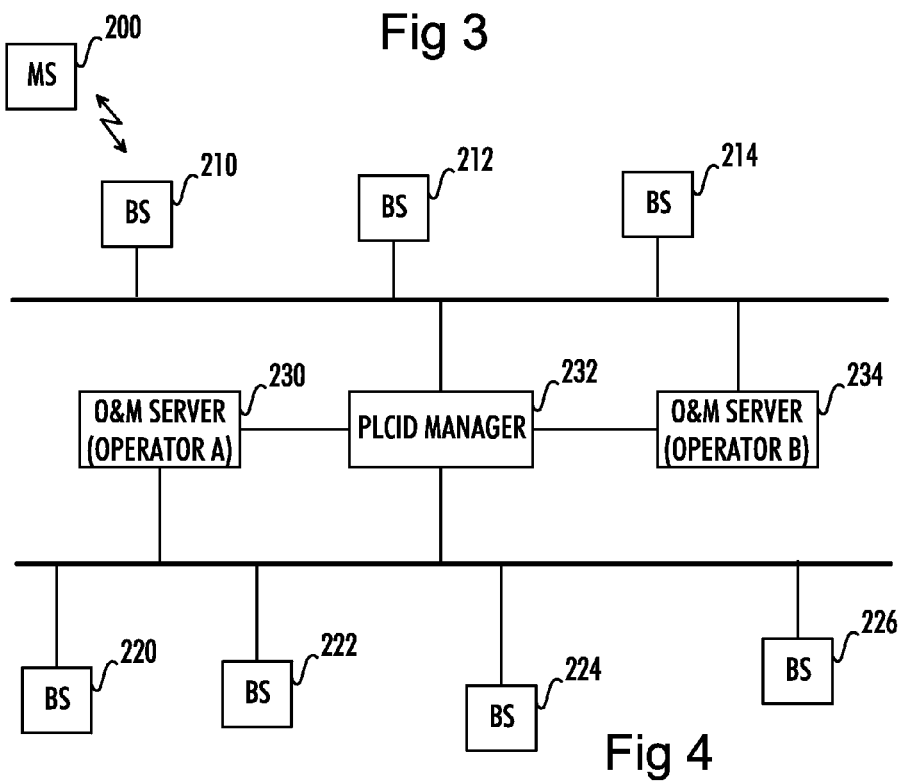
FIG. 4 illustrates another embodiment of implementing connections between the entities of the cellular radio access network.

FIG. 4 illustrates another embodiment of implementing connections between the entities of the cellular radio access network. In this embodiment, the base stations 210 to 226 have a direct IP connection with the PLCID manager 232, i.e. it is not necessary to route the communication connections between the base stations 210 to 226 and the PLCID manager 232 through the O&M servers 230, 234, although this is also possible. However, a PLCID allocation procedure will be described next in a case where the direct connection between the base stations 210 to 226 and the PLCID manager 232 is utilized. The PLCID allocation procedure is described with reference to the signaling diagram illustrated in FIG. 5.

Figure 5:
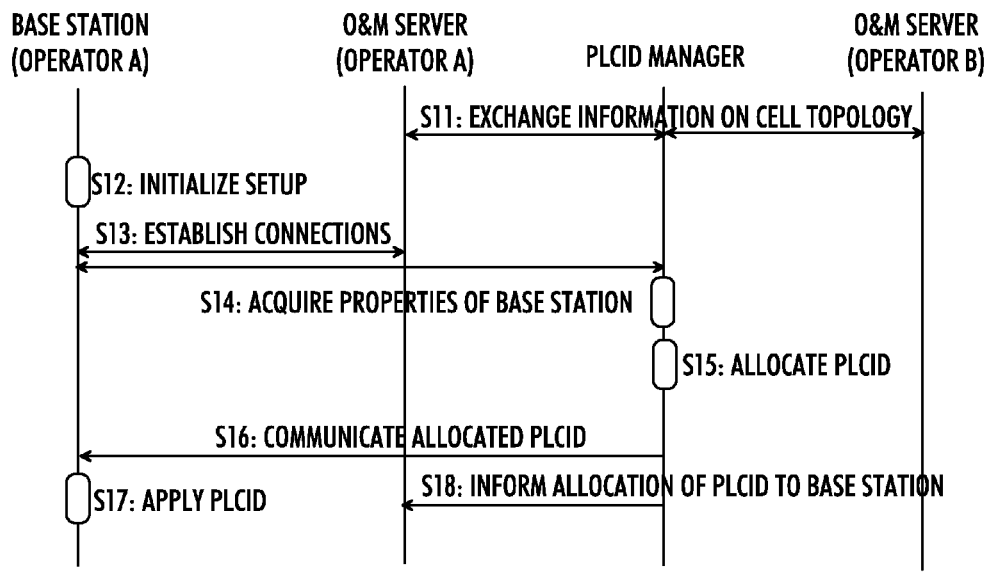
FIG. 5 illustrates signaling between the entities illustrated in FIG. 4 according to an embodiment of the invention.

Referring to FIG. 5, S11 and S12 corresponds to steps S1 and S2 of FIG. 3, respectively. In S13, the new base station establishes communication connections, e.g. IP connections, with both an O&M server and a PLCID manager. In S14, the PLCID manager acquires properties of the new base station. The PLCID manager may acquire the properties of the new base station in the same manner as the O&M server did in S4, or the PLCID manager may receive the properties of the new base station from the O&M server. The properties of the base station may include properties listed above. In S15, the PLCID manager allocates a PLCID to the new base station. The PLCID allocation may be carried out according to one of the three embodiments listed above. Steps S16 and S17 correspond to steps S7 and S8 of FIG. 3, respectively, except that the allocated PLCID is communicated to the new base station through the direct connection between the new base station and the PLCID manager is S16. In S18, the PLCID manager informs the O&M server of the PLCID allocated to the new base station to enable the O&M server to utilize the information in radio resource allocation, for example.

Figure 6:
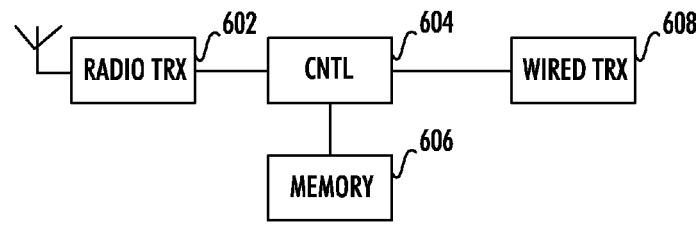
FIG. 6 illustrates a block diagram of a base station according to an embodiment of the invention.

FIG. 6 illustrates a block diagram of a structure of a base station utilizing a setup procedure according to an embodiment of the invention. The base station comprises a radio transceiver part 602 configured to provide the base station with capability of radio communications according to the radio communication protocol of the mobile telecommunication system in which the base station is configured to operate. The radio transceiver part 602 may be configured to process transmission and reception signals according to specifications of the mobile telecommunication system and transmission parameters received from the O&M server. Additionally, the base station comprises a wired transceiver part 608 configured to provide the base station with capability of communicating with other elements of the radio access network over an IP connection, for example.

The operation of the base station is controlled by one or more processors 604 driven by software stored in a memory unit 606. As to the invention, the one or more processors 604 control the setup configuration of the base station when the base station is first powered up in order to set the base station up for the operation in the mobile telecommunication system. In other words, the one or more processors control the base station to carry out the communication with the O&M server and the PLCID manager in order to receive a PLCID and radio transmission parameters and to apply the received PLCID and the radio transmission parameters. The received PLCID and the radio transmission parameters may be stored in the memory unit 606. The steps related to the invention are performed by the one or more processors 604. Accordingly, the one or more processors may be seen as an apparatus for setting up the base station for operation in a cellular radio access network, wherein the apparatus comprises an interface, e.g. the wired transceiver part 608, to enable the communication with the PLCID manager. Alternatively, the interface of the apparatus may be one or more input/output ports of the one or more processors. The interface may also be seen as an interface between two software modules if the PLCID manager is implemented in the base station.

Figure 7:
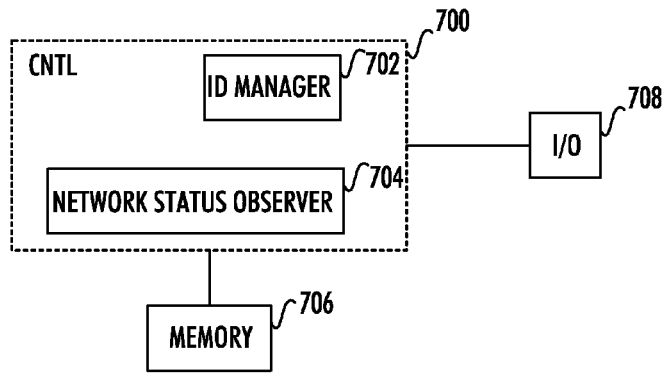
FIG. 7 illustrates a block diagram of a cell identifier manager according to an embodiment of the invention.

FIG. 7 illustrates a block diagram of a structure of a PLCID manager according to an embodiment of the invention. The PLCID manager comprises an input/output interface 708 to enable communication with the base stations for which the PLCID manager carries out PLCID allocation and with O&M servers within the control area of the PLCID manager. As above, the input/output interface may provide a physical layer communication connection between the PLCID manager and the base stations and/or O&M servers but also an interface between different software modules if the PLCID manager is implemented in a base station or in an O&M server.

Furthermore, the PLCID manager comprises a processor 700 implementing an ID manager 702 and a network status observer 704. The ID manager 702 and the network status observer 704 may be implemented as computer processes driven by software stored in a memory unit 706 of the PLCID manager. The ID manager may be configured to manage and allocate the PLCIDs according to any embodiment described above. The ID manager 702 may store in the memory unit 706 the allocated PLCIDs, free PLCIDs available for allocation, and cell topology and PLCID allocation in the control area of the PLCID manager and in neighboring control areas and carry out the allocation of the PLCIDs in such a manner that no identification problems occur. Upon detection of deactivation of a base station in the radio access network, the ID manger may be configured to release the PLCID of the deactivated base station in order to allocate the released PLCID to another base station. As a consequence, deactivated base stations do not consume the limited resource of PLCIDs.

The network status observer 704 may be configured to monitor active base stations, active durations, and frequency spectrum utilization of the base stations of different operators. Frequency spectrum utilization of base stations of a given operator may be monitored in order to enable determination of costs for the spectrum utilization for that operator for billing purposes. For example, if a frequency band is shared between multiple operators, the costs for the utilization of the frequency band may be determined from time duration an operator uses the frequency band and the bandwidth of the utilized frequency band. Accordingly, the cost may be determined in money units per second and per Hertz.

Moreover, the network status observer may provide the O&M servers with status updates of determined properties in the radio access network. Such properties may include the number of active cells operating in a determined area, frequency spectrum utilization of active base stations in that area, etc. The O&M servers may then use this type of information to trigger appropriate cell reconfiguration. For example, when the number of active base stations sharing the same spectrum within the determined area reaches a predetermined threshold, the O&M server may reconfigure some of the active base stations to utilize a different frequency spectrum. This, on the other hand, may trigger the PLCID manager to check whether or not the frequency reallocation carried out by the O&M server induces a cell identification problem and, if a possibility for the cell identification problem is detected, i.e. the base station having the reallocated spectrum now uses an overlapping spectrum and the same PLCID as another base station within the safety margin, the PLCID manager may reallocate the PLCIDs to one of the base stations in order to prevent a possible cell identification problem.

Accordingly, the O&M server capable of reallocating frequency resources on the basis of PLCIDs of active base stations and their location information received from the PLCID manager is an embodiment of an apparatus for controlling radio resources in a cellular telecommunication system. Such a radio resource controller apparatus comprises an interface to establish a communication connection with the PLCID manager and a processor for the actual radio resource control. The processor is configured to receive, through the interface from the PLCID manager, PLCIDs of and location information on active base stations in a control area of the radio resource controller apparatus and to allocate radio resources to the active base stations on the basis of the received cell identifiers and location information.

The invention may be applied to the dynamic allocation of the PLCIDs, as described above, but also to allocation of any other cell identifier type which is reused in a cellular mobile telecommunication system. For example, if the number of global cell identifiers were limited to require reuse of the global cell identifiers, the dynamic allocation of the global cell identifiers may be implemented according to the invention. Therefore, the PLCID manager may be seen in generally as a cell identifier manager.

Figure 8:
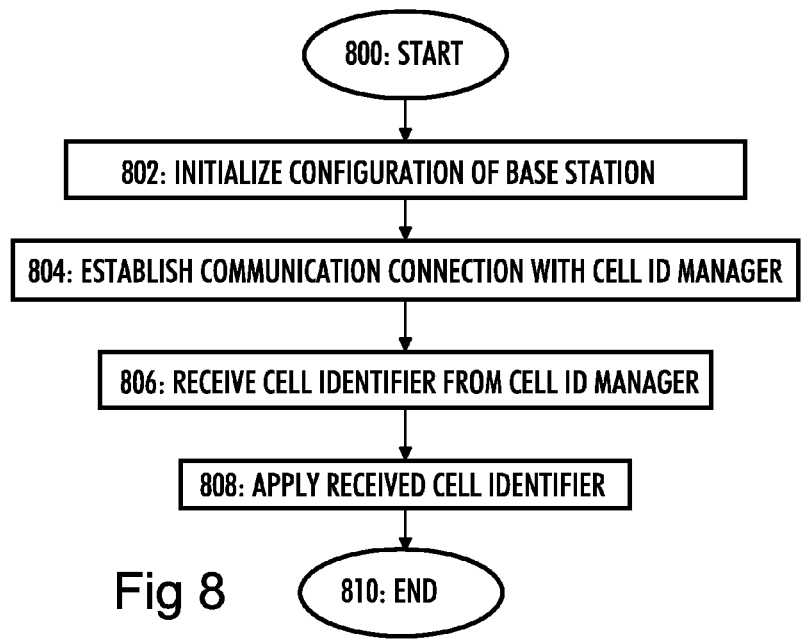
FIG. 8 is a flow diagram illustrating a process for setting up a base station for operation in a cellular radio access network.

FIG. 8 illustrates a process for setting up a base station for operation in a cellular radio access network. The base station may be a new base station to be added to the radio access network, or the base station may already have been configured for the operation and operated in the network but deactivated for a time period and now being reactivated. The process may be a computer process executed in the processor 604 of the base station. The process starts in block 800.

In block 802, the configuration of the base station for the operation in the radio access network is initialized. In block 804, the base station establishes a communication connection with a cell identifier manager configured to manage cell identifiers in its control area in the cellular radio access network and to allocate the cell identifiers to a plurality of base stations within the control area. If the base station is newly established in the cellular radio access network, the base station may at this phase transmit location information and coverage properties of the base station to the cell identifier manager in order to enable efficient allocation of the cell identifier. If the base station is reactivated for operation, the cell identifier manager may already possess such information, and transmission of such information may be omitted. If the base station is a private base station, it may be configured to provide the cell identifier manager with its location information every time the base station is reactivated to take into account possible mobility of the private base station. In block 806, the base station receives a cell identifier from the cell identifier manager, and the base station applies the received cell identifier for use in the operation in block 808. The process ends in block 810.

Figure 9:
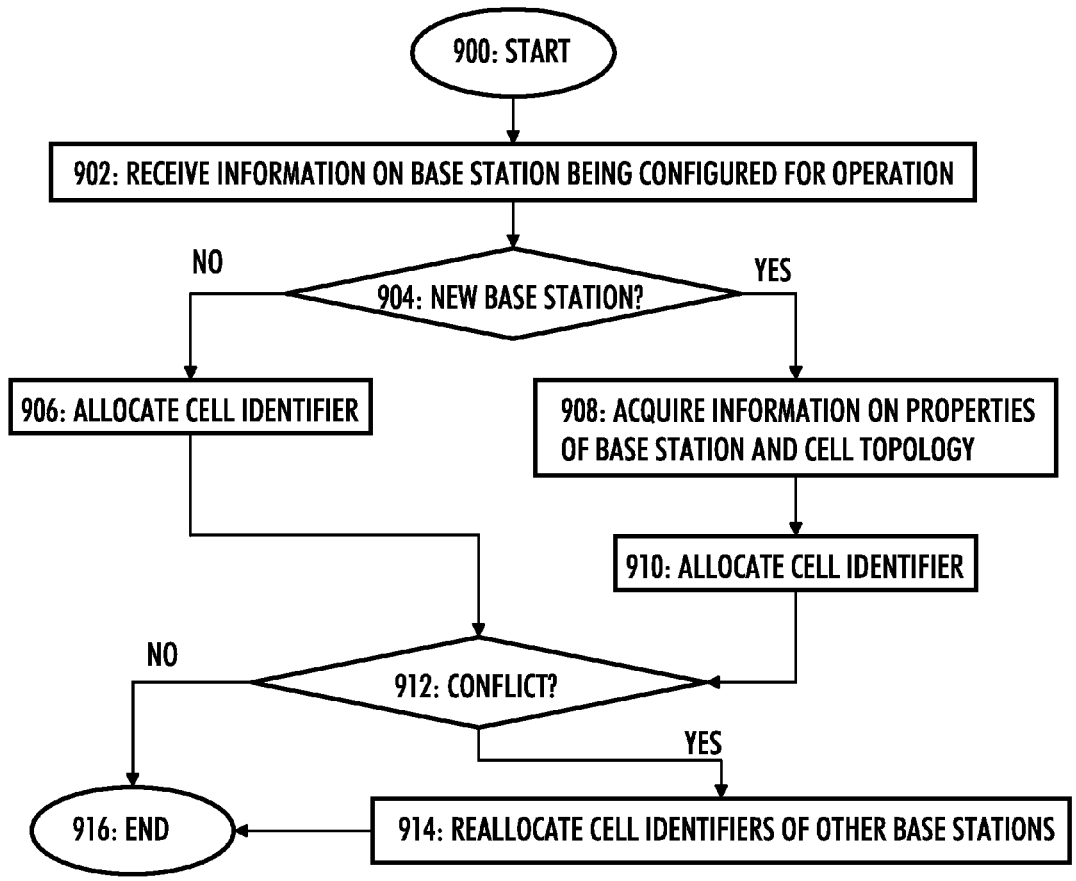
FIG. 9 is a flow diagram illustrating a process for allocating cell identifiers in the cellular radio access network.

FIG. 9 illustrates a process for allocating cell identifiers in the cellular radio access network. The process may be implemented in a cell identifier manager which may have the structure illustrated in FIG. 7. The process starts in block 900, and in block 902 the cell identifier manager receives information on a base station being configured for operation in the control area of the cell identifier manager.

In block 904, the cell identifier manager determines whether the base station being configured for the operation is a new base station being set up for the first time or an existing base station being reactivated. The cell identifier manager may determine this from the IP address, a global identifier, or other information related to the base station. If the IP address or the global identifier is stored in a memory unit of the cell identifier manager as a base station which has operated in the control area of the cell identifier manager, the cell identifier manager determines that the base station is to be reactivated. On the other hand, if the IP address or the global identifier is stored in a memory unit of the cell identifier manager as a base station which has operated in the control area of the cell identifier manager, the cell identifier manager determines that a base station is the new base station being configured for the first time.

If the base station is being reactivated, the process moves to block 906 where the cell identifier manager allocates a cell identifier to the base station on the basis of cell properties and cell topology stored in the memory unit of the cell identifier manager beforehand. Then, the process moves to block 912. On the other hand, if the base station is a new base station, the process moves from block 904 to block 908 where the cell identifier manager acquires information on properties of the base station and cell topology within the neighborhood of the base station. The properties of the base station may include the location information and the coverage properties of the base station. In block 910, the cell identifier manager allocates a cell identifier to the base station on the basis of the information acquired in block 908 in such a manner that identification problems are avoided.

In response to a case where the cell identifier allocated in block 906 or 910 does cause a conflict with another base station having the same cell identifier, the cell identifier manager may carry out blocks 912 and 914 in order to prevent identification problems. In block 912, the cell identifier manager checks whether the cell identifier allocated in block 906 or 910 causes a conflict with a cell identifier of another base station, i.e. a possible identification problem. If no conflict is detected in block 912, the process moves to block 916, where the process ends. On the other hand, if a conflict is detected in block 912, the process moves to block 914 where the cell identifier manager detects the base station(s) that has/have the same cell identifier as the one allocated in block 906 or 910. Then, the cell identifier manager reallocates cell identifiers of one or more base stations other than the base station to which the cell identifier was allocated in block 906 or 910 so that a conflict between the cell identifiers of the base stations is avoided. In practice, the density of base stations in a given area may be so high and the number of cell identifiers available for allocation so low that no new base station can be added without causing a cell identification problem with a current cell identifier layout. If a new base station can be added by rearranging the cell identifiers allocated to the base stations, the cell identifier manager carries out the rearrangement in block 914. Thereafter, the process ends in block 916.

The processes or methods described in FIGS. 8 and 9 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The cellular telecommunication system may have a fixed infrastructure of public base stations providing wireless services to any subscriber terminals configured for use in the cellular telecommunication system. Additionally, the cellular telecommunication system may comprise private base stations configured to provide wireless services only to specific subscriber terminals registered to a given private base station. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method for controlling a cellular radio access network, characterized by the method comprising:
    receiving, at a cell identifier manager configured to manage cell identifiers in a cellular radio access network and to allocate the cell identifiers to a plurality of base stations, information related to configuration of a base station for operation in the cellular radio access network;
    establishing a communication connection between the cell identifier manager and the base station being configured;
    allocating, by the cell identifier manager, a cell identifier to the base station; and
    transmitting the allocated cell identifier to the base station over the established communication connection, and further comprising:
    storing, in the cell identifier manager, cell identifiers available to the cell identifier manager for allocation; and
    allocating cell identifiers from the stored cell identifiers to base stations of a plurality of cellular radio access networks operated by different operators.

2. The method of claim 1, further comprising:
    dividing the cell identifiers into a plurality of subsets of cell identifiers;
    designating each subset of cell identifiers to one operator; and
    allocating the cell identifiers from a given subset to base stations of the operator designated with the subset.

3. The method of claim 2, further comprising changing the division of the cell identifiers in the plurality of subsets dynamically according to utilization of the cell identifiers in at least one of the subsets.

4. The method of claim 1, further comprising:
    storing, in a memory unit of the cell identifier manager, at least cell identifiers currently allocated to active base stations by the cell identifier manager, and location information related to locations of the active base stations;
    acquiring at least location information related to the base station being configured; and
    allocating to the base station being configured a cell identifier which has not been allocated to another base station located within a predetermined distance from the base station being configured, wherein the information on the cell identifiers allocated to base stations within the predetermined distance from the base station being configured is obtained from the information stored in the memory unit.

5. The method of claim 4, further comprising:
    storing, in the memory unit of the cell identifier manager, coverage information on the base stations having cell identifiers allocated by the cell identifier manager;
    acquiring coverage information on the base station being configured; and
    allocating to the base station being configured a cell identifier which has not been allocated to a base station whose coverage area is within a predetermined distance from the coverage area of the base station being configured.

6. The method of claim 5, wherein the coverage information on a given base station is defined by at least one of the following parameters: cell range, maximum transmission power, at least one measure of cell size and cell shape.

7. The method of claim 1, further comprising:
    determining whether or not a cell identifier can be allocated to the base station being configured without causing a conflict with another base station that has been allocated the same cell identifier;
    reallocating cell identifiers to one or more active base stations, if it has been determined that the allocation of the cell identifier to the base station being configured causes a conflict with the other base station.

8. The method of claim 1, further comprising: releasing a cell identifier of a base station being deactivated in order to allocate the cell identifier to another base station.

9. The method of claim 1, further comprising:
    monitoring, by the cell identifier manager, the number and location of active base stations within a determined geographical area; and transmitting cell identifiers of and location information on active base stations within the determined geographical area to a radio resource controller of the radio access network for radio resource allocation purposes.

10. The method of claim 9, further comprising:
receiving, at the radio resource controller, cell identifiers of and location information on the active base stations; and
allocating, by the radio resource controller, radio resources to the active base stations on the basis of the received cell identifiers and location information.

11. An apparatus for managing cell identifiers in a cellular radio access network and for allocating the cell identifiers to a plurality of base stations, characterized by comprising:
an interface configured to receive information related to configuration of a base station for operation in the cellular radio access network; and
a controller configured to establish a communication connection with the base station being configured through the interface, to allocate a cell identifier to the base station, and to transmit the allocated cell identifier to the base station through the interface over the established communication connection, and
further comprising a memory unit configured to store cell identifiers available for allocation, wherein the processor is further configured to allocate cell identifiers from the stored cell identifiers to base stations of a plurality of cellular radio access networks operated by different operators.

12. The apparatus of claim 11, wherein the processor is further configured to divide the cell identifiers into a plurality of subsets of cell identifiers, to designate each subset of cell identifiers to one operator, and to allocate the cell identifiers from a given subset to base stations of the operator designated with the subset.

13. The apparatus of claim 12, wherein the processor is further configured to change the division of the cell identifiers in the plurality of subsets dynamically according to utilization of the cell identifiers in at least one of the subsets.

14. The apparatus of claim 11, further comprising a memory unit configured to store at least cell identifiers currently allocated to active base stations by the cell identifier manager and location information related to locations of the active base stations, wherein the processor is further configured to acquire at least location information related to the base station being configured and to allocate to the base station being configured a cell identifier which has not been allocated to another base station located within a predetermined distance from the base station being configured, wherein the information on the cell identifiers allocated to base stations within the predetermined distance from the base station being configured is obtained from the information stored in the memory unit.

15. The apparatus of claim 14, wherein the memory unit is configured to store coverage information on the active base stations having cell identifiers allocated by the processor, and wherein the processor is further configured to acquire coverage information on the base station being configured and to allocate to the base station being configured a cell identifier which has not been allocated to an active base station whose coverage area is within a determined distance from the coverage area of the base station being configured.

16. The apparatus of claim 15, wherein the coverage information on a given base station is defined by at least one of the following parameters: cell range, maximum transmission power, at least one measure of cell size and cell shape.

17. The apparatus of claim 11, wherein the processor is further configured to determine whether or not a cell identifier can be allocated to the base station being configured without causing a conflict with another base station that has been allocated the same cell identifier, and to reallocate cell identifiers to one or more active base stations, if it has been determined that the allocation of the cell identifier to the base station being configured causes a conflict with the other base station.

18. The apparatus of claim 11, wherein the processor is further configured to release a cell identifier of a base station upon deactivation of the base station in order to allocate the cell identifier to another base station.

19. The apparatus of claim 11, wherein the processor is further configured to monitor the number and location of active base stations within a determined geographical area and to transmit, through the interface, cell identifiers of and location information on the active base stations within the determined geographical area to a radio resource controller of the radio access network for radio resource allocation purposes.

20. An apparatus for managing cell identifiers in a cellular radio access network and for allocating the cell identifiers to a plurality of base stations, characterized by comprising:
means for receiving information related to configuration of a base station for operation in the cellular radio access network;
means for establishing a communication connection between the cell identifier manager and the base station being configured;
means for allocating a cell identifier to the base station; and
means for transmitting the allocated cell identifier to the base station over the established communication connection, and further comprising:
means for storing, in the cell identifier manager, cell identifiers available to the cell identifier manager for allocation; and
means for allocating cell identifiers from the stored cell identifiers to base stations of a plurality of cellular radio access networks operated by different operators.

21. A computer program product embodied on a distribution medium readable by a computer and comprising program instructions which, when loaded into an apparatus, execute a computer process for managing cell identifiers in a cellular radio access network and for allocating the cell identifiers to a plurality of base stations, characterized by the process comprising:
receiving information related to configuration of a base station for operation in the cellular radio access network;
establishing a communication connection with the base station being configured;
allocating a cell identifier to the base station; and
transmitting the allocated cell identifier to the base station over the established communication connection, and further comprising:
storing, in the cell identifier manager, cell identifiers available to the cell identifier manager for allocation; and
allocating cell identifiers from the stored cell identifiers to base stations of a plurality of cellular radio access networks operated by different operators.

* * * * *